United States Patent
Shoykhet et al.

(10) Patent No.: US 7,941,141 B2
(45) Date of Patent: May 10, 2011

(54) SYSTEM AND METHOD FOR SELECTING A FREQUENCY FOR PERSONAL-USE FM TRANSMISSION

(75) Inventors: Eugene L. Shoykhet, Olathe, KS (US); Jason D. Bridges, Lenexa, KS (US)

(73) Assignee: Garmin Switzerland GmbH (CH)

( * ) Notice: Subject to any disclaimer, the term of this patent is extended or adjusted under 35 U.S.C. 154(b) by 971 days.

(21) Appl. No.: 11/626,686

(22) Filed: Jan. 24, 2007

(65) Prior Publication Data
US 2008/0057888 A1    Mar. 6, 2008

Related U.S. Application Data

(60) Provisional application No. 60/824,405, filed on Sep. 1, 2006, provisional application No. 60/824,256, filed on Aug. 31, 2006.

(51) Int. Cl.
*H04Q 7/20* (2006.01)
(52) U.S. Cl. .................... 455/434; 455/550.1; 455/556.1
(58) Field of Classification Search ............... 455/161.1, 455/434, 515, 550.1, 556.1, 575.9
See application file for complete search history.

(56) References Cited

U.S. PATENT DOCUMENTS

| | | | | |
|---|---|---|---|---|
| 5,243,645 A * | 9/1993 | Bissell et al. | ............ | 379/211.02 |
| 5,434,626 A * | 7/1995 | Hayashi et al. | ................ | 348/569 |
| 5,842,119 A * | 11/1998 | Emerson et al. | ........... | 455/161.3 |
| 6,243,645 B1 | 6/2001 | Moteki et al. | | |
| 6,304,764 B1 * | 10/2001 | Pan | ............................ | 455/569.2 |
| 6,782,239 B2 * | 8/2004 | Johnson et al. | ................. | 455/42 |
| 6,957,053 B1 * | 10/2005 | Moers | ......................... | 455/186.1 |
| 6,992,619 B2 * | 1/2006 | Harrison | .................. | 342/357.13 |
| 7,062,379 B2 * | 6/2006 | Videtich | ........................ | 701/210 |
| 7,376,402 B2 * | 5/2008 | Lecomte et al. | ........... | 455/186.1 |
| 2002/0086716 A1 * | 7/2002 | Pan | ................................. | 455/569 |
| 2003/0236075 A1 * | 12/2003 | Johnson et al. | ................. | 455/99 |
| 2004/0157572 A1 * | 8/2004 | Ramaswamy | ............. | 455/150.1 |
| 2004/0204159 A1 * | 10/2004 | Van Bosch | ................. | 455/569.1 |
| 2005/0146990 A1 * | 7/2005 | Mayer | ............................. | 368/95 |
| 2005/0192033 A1 * | 9/2005 | Videtich | .................... | 455/456.6 |
| 2006/0166632 A1 * | 7/2006 | Yun et al. | .................... | 455/182.2 |
| 2006/0174294 A1 * | 8/2006 | Kim et al. | ........................ | 725/90 |
| 2006/0223467 A1 * | 10/2006 | Mason | ........................ | 455/185.1 |
| 2006/0293007 A1 * | 12/2006 | Kim | .............................. | 455/145 |
| 2007/0143816 A1 * | 6/2007 | Gupta et al. | ................... | 725/135 |
| 2007/0173293 A1 * | 7/2007 | Tran | ........................... | 455/569.1 |
| 2008/0051917 A1 * | 2/2008 | Lee | ................................. | 700/94 |
| 2008/0212785 A1 * | 9/2008 | Ullmann | .......................... | 381/2 |
| 2009/0170446 A1 * | 7/2009 | Heijnen | .......................... | 455/77 |

OTHER PUBLICATIONS

Krumm, John et al, "RightSPOT: A Novel Sense of Location for a Smart Personal Object," Microsoft Corporation, UbiComp, 8 pages, Oct. 2003.

* cited by examiner

*Primary Examiner* — Nhan Le
(74) *Attorney, Agent, or Firm* — Samuel M. Korte

(57) ABSTRACT

A portable electronic device includes a radio frequency receiver; a radio frequency transmitter; and a processing system coupled with the receiver and transmitter. The processing system directs the receiver to scan a radio frequency spectrum for available radio channels over which the transmitter may transmit. The processing system may further direct the receiver to perform a second scan for radio channels which are actively transmitting information. The processing system then selects an available radio channel as the radio channel best suited for use by the transmitter to transmit information to the external audio system. The processing system may select a transmission frequency which is spectrally distant from the active radio channels and/or may take into account a transmission profile of the transmitter to select a frequency that does not interfere with the reception of incoming radio signals.

15 Claims, 6 Drawing Sheets

SYSTEM AND METHOD FOR SELECTING A FREQUENCY FOR PERSONAL-USE FM TRANSMISSION

CROSS-REFERENCE TO RELATED APPLICATIONS

The present application claims the benefit under 35 U.S.C. §119(e) of U.S. Provisional Application Ser. No. 60/824,256, entitled "SYSTEM AND METHOD FOR AUTOMATICALLY DETECTING A FREQUENCY TO USE FOR PERSONAL-USE FM TRANSMISSION," filed Aug. 31, 2006, and U.S. Provisional Application Ser. No. 60/824,405, entitled "SYSTEM AND METHOD FOR AUTOMATICALLY DETECTING A FREQUENCY TO USE FOR PERSONAL-USE FM TRANSMISSION," filed Sep. 1, 2006. U.S. Provisional Application Ser. Nos. 60/824,256 and 60/824,405 are herein incorporated by reference in their entireties.

BACKGROUND

1. Field

The present invention relates to electronic devices such as navigation devices, portable MP3 players, portable DVD players, and the like, and, more particularly, to a device, system, and method for selecting a frequency for personal-use FM transmission.

2. Description of the Related Art

Personal-use FM (Frequency Modulation) transmitters are used for transmitting audio information to external audio systems such as home stereo systems or automobile audio systems. This permits the audio information to be played with greater sound quality than would be possible with the electronic device alone. For example, personal-use FM transmitters are often used with portable electronic devices such as MP3 players, portable DVD players, and portable navigation devices for transmitting audio information to an automobile audio system.

In such uses, the personal-use FM transmitter and the FM receiver of the external audio system must be tuned to the same radio frequency or channel to permit audio information to be transmitted between the devices. Ideally, this common channel should not interfere with the broadcast frequencies of other transmitters such as FM radio station transmitters, Traffic Message Channel (TMC) transmitters, or the like.

Personal-use FM transmitters and the external audio systems to which they transmit are typically tuned in one of two ways. In a first way, a personal-use FM transmitter is pre-set to a particular frequency during manufacture or installation so that it always transmits over the same frequency. A corresponding receiver of an external audio system is then manually tuned to the same pre-set frequency. The selected frequency is usually near the bottom of the FM frequency spectrum, because these frequencies are rarely used by private radio stations. However, many universities and other public radio stations are now transmitting on these lower FM frequency channels, thus interfering with the pre-set frequencies of many personal-use FM transmitters. A second way of tuning requires a user to randomly select a transmission frequency and then manually tune both the personal-use FM transmitter and the FM receiver of the external audio system to the selected frequency. The user then listens to the speakers of the external audio system to ensure that the selected frequency does not interfere with other received transmissions. If it does, the user must repeat these steps until an available frequency is found. This process is time-consuming and frequently fails to find a transmission frequency without interference.

Consequently, it would be desirable to provide a personal-use FM transmitter capable of allowing a user to more efficiently and accurately selecting a frequency for personal-use FM transmission.

SUMMARY

Accordingly, the present invention is directed to a device, system, and method for more efficiently and accurately selecting a frequency for personal-use FM transmission. In exemplary embodiments, the present invention may be implemented with any electronic device having a low power transmitter configured for short range transmission of audio information. In one embodiment of the invention, the device is a portable electronic device comprising a radio frequency receiver; a radio frequency transmitter; and a processing system coupled with the receiver and transmitter. The processing system directs the receiver to scan a radio frequency spectrum for available radio channels over which to transmit. The processing system then selects one of the available radio channels as best suited for use by the transmitter to transmit audio information to an external audio system.

The processing system may also direct the receiver to perform a second scan for radio channels which are actively transmitting information and then select a transmission frequency for the transmitter that does not interfere with any of these active radio channels. The processing system may select a transmission frequency which is spectrally distant from the active radio channels and/or may take into account a transmission profile of the transmitter to select a frequency that does not interfere with the reception of incoming radio signals.

In one embodiment, the receiver may be tuned to receive traffic information transmitted from an external traffic information broadcaster. In this embodiment, the processing system directs the receiver to scan for available radio channels and selects a radio channel for use by the transmitter which does not interfere with the receipt of the traffic information. As with other embodiments, the processing system may select a transmission frequency which is spectrally distant from the frequency of the external traffic information broadcaster and/or may take into account a transmission profile of the transmitter when selecting the transmission frequency. The processing system may also direct the receiver to make an initial scan, and possibly subsequent scans, to locate a channel over which traffic information is broadcast.

The device of the present invention may further comprise a navigation device having a location determining system which may include a Global Positioning System (GPS) receiver for determining a current location of the device. Using the current location, the processing system may access a database of known radio station frequencies referenced by location to quickly locate all active radio channels within range of the current location of the device. The processing system can then quickly select a transmission frequency for the transmitter which does not interfere with any of these known active radio channels. The database or another database may also include a list of all known traffic information broadcasters referenced by location. The processing system can access the database and quickly locate an in-range traffic information broadcaster based on the current location of the device.

In specific embodiments, the device may further include a rechargeable battery and a charger for charging the rechargeable battery. The low power transmitter may be incorporated in the charger. The charger may include a first plug for insertion into a cigarette lighter receptacle, a second plug for receipt within a power port on the device, and an electrical conductor between the first plug and the second plug which serves to both conduct current between the plugs and as an antenna for the transmitter.

Other embodiments of the device may also include, or be operable to access, a database of optimal transmission frequencies cross-referenced to locations. The optimal transmission frequency for each location may be selected to avoid interference with all known active radio channels near the location. The optimal transmission frequencies may also be selected to take into account the transmission profile of the transmitter. The processing system may determine or access its current location and then search the database for the optimal transmission frequency based on the location.

In embodiments of the invention, the selected transmission frequency for the low power transmitter may be displayed so a user may tune the receiver of the external audio system to this frequency. Alternatively, the selected transmission may be sent to the audio system so the audio system may automatically tune itself to the selected frequency.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Embodiments of the present invention are described in detail below with reference to the attached drawing figures, wherein.

Figure 1:
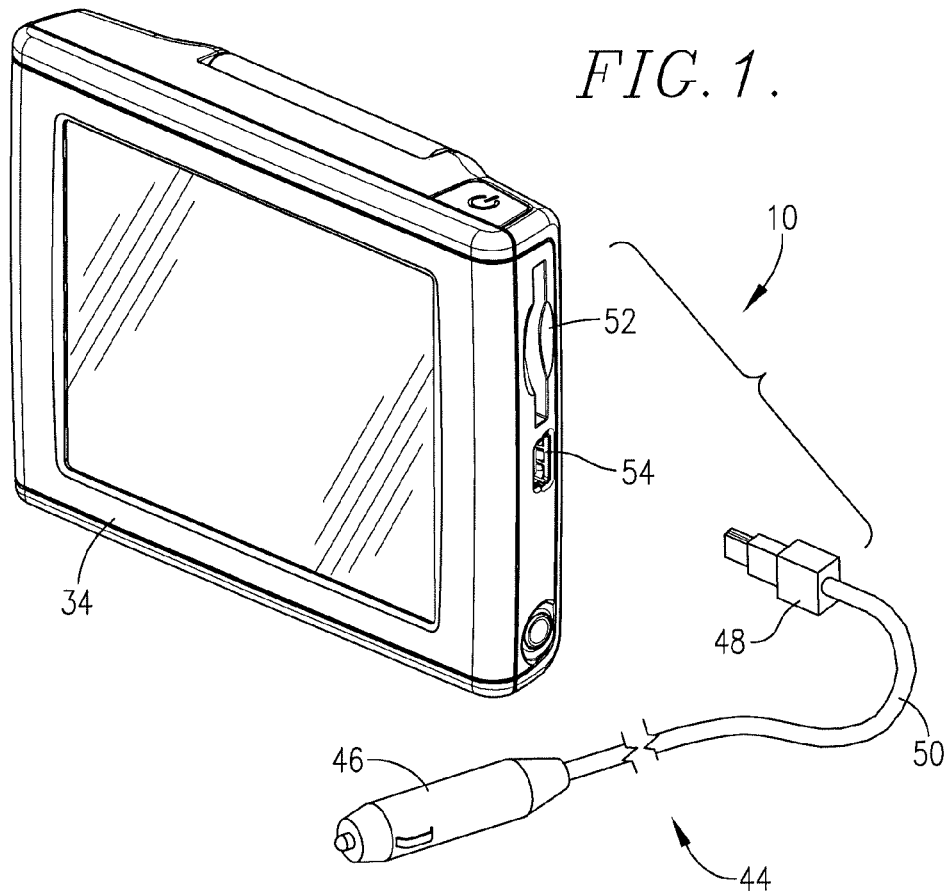
FIG. 1 is an isometric view illustrating an electronic device which may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

The present invention can be implemented in hardware, software, firmware, or a combination thereof. In one embodiment, the invention is implemented with an electronic device 10, an example of which is illustrated in FIG. 1. The electronic device 10 may be any device operable to transmit audio information to an external audio system via a low power transmitter. Thus, the device 10 may be a navigation device, MP3 player, DVD player, personal travel assistant, GPS-enabled mobile telephone, computer, television, radio, or portable processing system such as a laptop computer or personal data assistant (PDA).

One embodiment of the invention is a portable electronic device comprising a radio frequency receiver; a radio frequency transmitter; and a processing system coupled with the receiver and transmitter. The processing system directs the receiver to scan a radio frequency spectrum for available radio channels over which to transmit. The processing system then selects which of the available radio channels should be used by the transmitter to transmit audio information to an external audio system. The processing system may also direct the receiver to perform a second scan for radio channels which are actively transmitting information and then select a transmission frequency for the transmitter that does not interfere with any of these active radio channels. The processing system may select a transmission frequency which is spectrally distant from the active radio channels and/or may take into account a transmission profile of the transmitter to select a frequency that does not interfere with the reception of incoming radio signals.

A particular embodiment of the electronic device is a portable navigation device such as a GPS navigation device, a GPS-enabled cell phone, or a GPS-enabled PDA. Examples of such navigation devices and personal travel assistant devices are manufactured by GARMIN INTERNATIONAL, INC. of Olathe, Kans. The navigation device comprises a receiver, a transmitter, and a processing system coupled with the receiver and the transmitter. The receiver may be tuned to receive traffic information transmitted from an external traffic information broadcaster. The transmitter may be tuned to transmit at least a portion of the traffic information to an external audio system so it may be audibly reproduced by a speaker coupled with the external audio system. The processing system directs the receiver to scan for available radio channels and selects a radio channel for use by the transmitter which does not interfere with the receipt of the traffic information.

Figure 2:
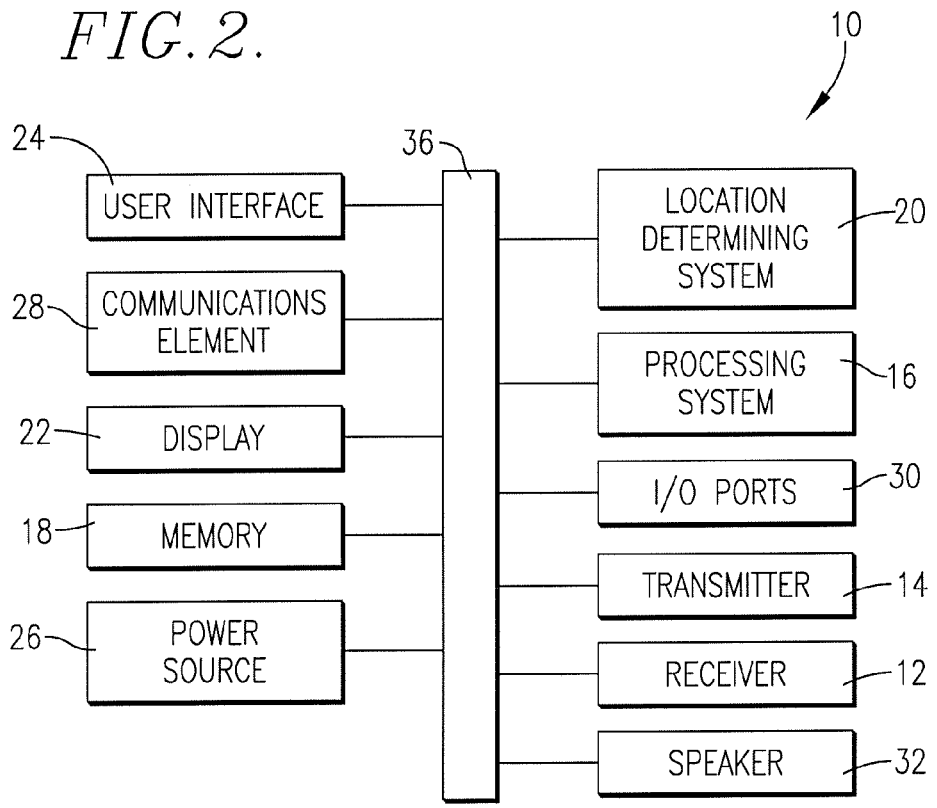
FIG. 2 is a block diagram illustrating certain components of the device of FIG.

In more detail, and as best illustrated in FIGS. 1 and 2, an embodiment of the electronic device 10 includes a receiver 12, a transmitter 14, a processing system 16, a memory 18, a location determining system 20, a display 22, a user interface 24, a power source 26, a communications element 28, one or more I/O ports 30, one or more speakers 32, and a housing 34 for housing the various components of the device 10.

The receiver 12 is provided to wirelessly receive information transmitted from an external source. For example, in exemplary embodiments, the receiver is a Frequency Modulated (FM) receiver for receiving information such as music, Radio Data system (RDS) information, FM Traffic Message Channel (TMC) information, direct band information such as MSN Direct™ data, or the like. The receiver 12 may also be an AM receiver, satellite receiver, Bluetooth™ receiver, cellular receiver, or any other conventional receiver. In one embodiment of the invention discussed in more detail below, the receiver 12 is specifically configured for receiving TMC information. TMC is a technology for delivering traffic and travel information to drivers. TMC is typically digitally coded using the FM-RDS system on conventional FM radio broadcasts. It can also be transmitted on DAB or satellite radio. TMC allows silent delivery of high quality accurate, timely and relevant traffic information, in the language chosen by the user and without interrupting normal services. Traffic information providers, both public and commercial, are now operational in many countries. Received traffic information may be integrated directly into a navigation system such as provided by the location determining system 20 and processing system 16 to give the driver the option to take alternative routes to avoid traffic incidents.

The transmitter 14 wirelessly transmits audio information from the device 10 to an external audio system such as a vehicle-equipped audio system, a home stereo system, a portable stereo system, or any other device equipped with a radio receiver. In one embodiment, the transmitter 14 is a low power personal-use FM transmitter for transmitting audio information such as music, speech, turn-by-turn instructions, etc. to the eternal audio system so that the transmitted audio information may be reproduced by the speakers of the external audio system. The transmitter may also be an AM transmitter, a Bluetooth™ transmitter, a cellular transmitter, or any other conventional transmitter. The receiver 12 and transmitter 14 may be separate components or may be integrated into a single transceiver assembly.

The processing system 16 may include any number of processors, controllers, integrated circuits, programmable logic devices, or other processing systems and resident or external memory for storing data and other information accessed and/or generated by the device 10. The processing system 16 is preferably coupled with the receiver 12, transmitter 14, memory 18, location determining system 20, and the other components of the device, through wired or wireless connections, such as a data bus 36, to enable information to be exchanged between the various components.

The processing system 16 may implement a computer program or programs which implement certain aspects of the methods described herein. The computer programs preferably comprise ordered listings of executable instructions for implementing logical functions in the processing system. The computer programs can be embodied in any computer-readable medium for use by or in connection with an instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The memory 18 may be integral with the location determining system 20, integral with the processing system 16, stand-alone memory, or a combination of both. The memory may include, for example, removable and non-removable memory elements such as RAM, ROM, flash, magnetic, optical, USB memory devices, and/or other conventional memory elements.

The memory 18 may store various data associated with operation of the device 10, such as the computer program and code segments mentioned above, or other data for instructing the processing system 16 and other device elements to perform the steps described herein. Further, the memory 18 may store various cartographic data corresponding to geographic locations including map data, and map elements, such as thoroughfares, terrain, alert locations, points of interest, geographic entities, radio stations, and other navigation data to facilitate the various navigation functions provided by the device 10. Additionally, the memory 18 may store destination addresses and previously calculated or otherwise acquired routes to various destination addresses for later retrieval by the processing system 16.

In accordance with one aspect of the present invention, the memory 18 or some other memory accessible by the processing system 16 stores a database of known radio station frequencies referenced by location so that the processing system may quickly locate all active radio channels within range of the current location of the device as described in more detail below. The database or another database may also include a list of all traffic information broadcasters referenced by location. The processing system can access the database and quickly locate an in-range traffic information broadcaster based on the current location of the device. The database or another database may also include a list of optimal transmission frequencies cross-referenced to locations. The optimal transmission frequency for each location may be selected to avoid interference with all known active radio channels in the location. The optimal transmission frequencies may also be selected to take into account the transmission profile of the transmitter as described below.

The various data stored within the memory 18 may be associated within one or more databases to facilitate retrieval of the information. For example, the databases may be configured to enable the processing system 16 to automatically access the database of known radio stations based upon a current geographic location of the device 10 as discussed in more detail below.

A search engine, preferably comprised of software, firmware or the like, executed by the processing system 16, may be provided to search through the databases. A user may initiate a search or the search engine may automatically search the database based on a state of the device 10 such as the current position of the device 10.

The search engine, or alternatively a separate computation engine (also preferably comprised of software, firmware or the like executed by the processing system 12), may also perform calculations related to the methods described below.

The location determining system 20 may comprise any device or component operable to determine or access geographic location information for the device 10. The location determining system 20 may include, for example, a GPS receiver much like those provided in products by Garmin International, Inc. In general, the GPS is a satellite-based radio navigation system capable of determining continuous position, velocity, time, and direction information for an unlimited number of users. Formally known as NAVSTAR (Navigation Signal Timing and Ranging), the GPS incorporates a plurality of satellites which orbit the earth in extremely precise orbits. Based on these precise orbits, GPS satellites can relay their location to any number or receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Acquiring a fourth satellite signal will allow the receiving device to calculate its three-dimensional position by the same geometrical calculation. The positioning and velocity data can be updated in real time on a continuous basis by an unlimited number of users.

Although GPS enabled devices are often used to describe navigational devices, it will be appreciated that satellites need not be used to determine a geographic position of a receiving unit since any receiving device capable of receiving the location from at least three transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit. In this way, personal hand held devices, cell phones, intelligent appliances, intelligent apparel, and others can be readily located geographically, if appropriated equipped to be a receiving unit.

Figure 3:
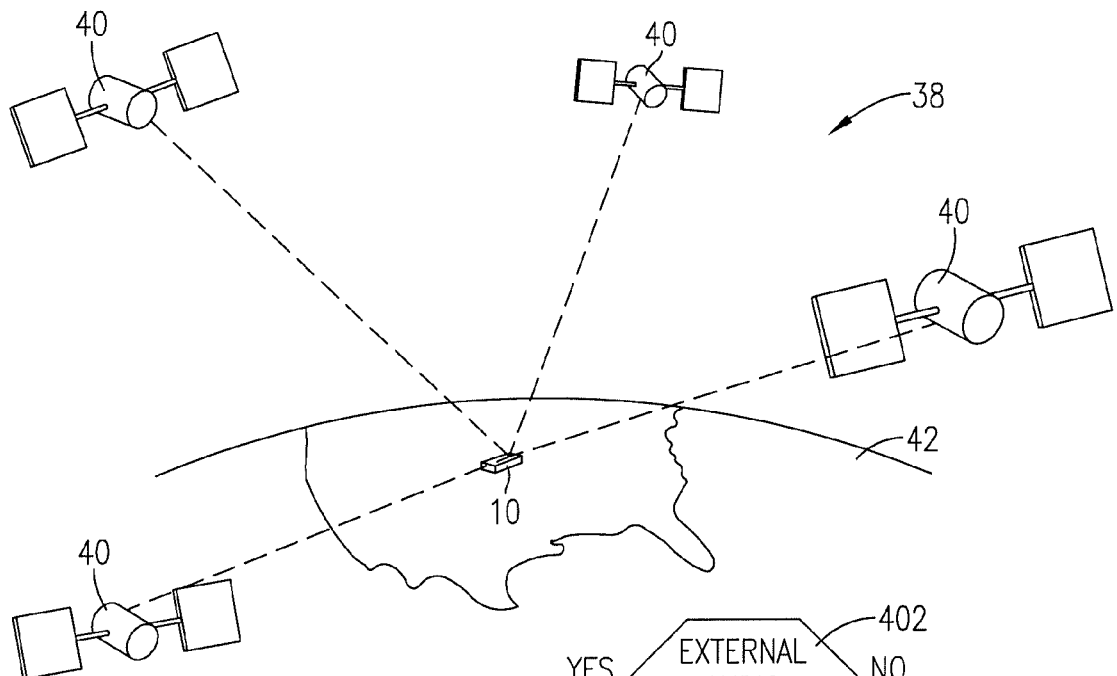
FIG. 3 is schematic diagram of a Global Positioning System (GPS) that may be utilized by various embodiments of the present invention.

FIG. 3 shows one representative view of a GPS denoted generally by reference numeral 38. A plurality of satellites 40 are in orbit about the Earth 42. The orbit of each satellite is not necessarily synchronous with the orbits of other satellites and, in fact, is likely asynchronous. A GPS receiver device 10 such as the ones described in connection with preferred embodiments of the present invention is shown receiving spread spectrum GPS satellite signals from the various satellites 40.

The spread spectrum signals continuously transmitted from each satellite 36 utilize a highly accurate frequency standard accomplished with an extremely accurate atomic clock. Each satellite 40, as part of its data signal transmission, transmits a data stream indicative of that particular satellite. The device 10 must acquire spread spectrum GPS satellite signals from at least three satellites for the GPS receiver device to calculate its two-dimensional position by triangulation. Acquisition of an additional signal, resulting in signals from a total of four satellites, permits the device 10 to calculate its three-dimensional position.

The location determining system 20 and processing system 16 are operable to receive navigational signals from the GPS satellites 40 and to calculate positions of the device 10 as a function of the signals. The location determining system 20 and processing system 16 may, for example, determine a track log or any other series of geographic coordinates corresponding to points along a path traveled by a user of the device. The location determining system 20 and/or the processing system 16 are also operable to calculate a route to a desired location, provide instructions to navigate to the desired location, display maps and other information on the display screen 22, and to execute other functions described herein.

The location determining system 20 may include one or more processors, controllers, or other processing systems and memory so that it may calculate location and other geographic information without the processing system 16 or it may utilize the components of the processing system 16. Further, the location determining system 20 may be integral with the processing system 16 such that the location determining system 20 may be operable to specifically perform the various functions described herein. Thus, the processing system 16 and location determining system 20 can be combined or be separate or otherwise discrete elements.

In other embodiments, the location determining system 20 need not directly determine the current geographic location of the device 10. For instance, the location determining system 20 may determine the current geographic location by receiving location information directly from the user, through a communications network, or from another electronic device.

The location determining system 20 may include an antenna to assist in receiving the satellite signals. The antenna may be a removable quad-helix antenna or any other type of antenna that can be used with navigational devices. The antenna may be mounted directly on or in the housing 32 or may be mounted external to the housing.

The display 22 is coupled with the processing system and is operable to display various information corresponding to the device 10, such as the screen displays shown in FIGS. 9 through 14. The display may comprise color display elements (or alternatively, black and white or monochrome display elements) including, but not limited to, LCD (Liquid Crystal Diode), TFT (Thin Film Transistor) LCD, CRT (Cathode Ray Tube), LEP (Light Emitting Polymer or PLED (Polymer Light Emitting Diode), and/or plasma display devices. Preferably, the display is of sufficient size to enable the user to easily view the display to receive presented information while in transit.

Further, as described above, the display 22 may be integrated with the user interface 24, such as in embodiments where the display 22 is a touch-screen display to enable the user to interact with the display 22 by touching or pointing at display areas to provide information to the device 10.

The user interface 24 permits a user to operate the device 10 and enables users, third parties, or other devices to share information with the device 10. The user interface 24 is generally associated with the housing 34, such as by physical connection through wires, etc, or wirelessly utilizing conventional wireless protocols. The user interface 24 need not be physically coupled with the housing 34.

The user interface 24 may comprise one or more functionable inputs such as buttons, switches, scroll wheels, a touch screen associated with the display, voice recognition elements such as a microphone, pointing devices such as mice, touchpads, trackballs, styluses, a camera such as a digital or film still or video camera, combinations thereof, or the like. Further, the user interface 24 may comprise wired or wireless data transfer elements such as removable memory including the memory 18, data transceivers, and the like, to enable the user and other devices or parties to remotely interface with the device 10. The device 10 may also include a speaker for providing audible instructions and feedback.

The user interface 24 may be operable to provide various information to the user utilizing the display 22 or other visual or audio elements such as the speaker 32. Thus, the user interface 24 enables the user and device 10 to exchange information relating to the device 10, including fuel station information, geographic entities, configuration, security information, preferences, route information, points of interests, alerts and alert notification, navigation information, waypoints, a destination address, or the like.

The power source 26 may be associated with the housing 34 to provide electrical power to various device 10 elements. For example, the power source 26 may be directly or indirectly coupled with the powered components of the device 10. The power source 26 may comprise conventional power supply elements, such as batteries, battery packs, etc. The power source 26 may also comprise power conduits, connectors, and receptacles operable to receive batteries, battery connectors, or power cables. For example, the power source 26 may include both a battery to enable portable operation and a power input for receiving power from an external source such an automobile.

In exemplary embodiments, the device 10 may include a rechargeable battery and a charger 44 as shown in FIG. 1. In accordance with one aspect of the present invention, the transmitter 14 may be incorporated in the charger 44. Specifically, the charger 44 may include a first plug 46 for insertion into a cigarette lighter receptacle, a second plug 48 for receipt within a power port on the navigation device, and an electrical conductor 50 between the plugs. In some embodiments, the transmitter 14 may be positioned in the first plug 46 so that the conductor 50 serves to both conduct current between the plugs and as an antenna for the transmitter 14.

The communications element 28 enables the device 10 to communicate with other electronic devices or any other network enabled devices through a communication network, such as the Internet, a local area network, a wide area network, an ad hoc or peer to peer network, or a direct connection such as a USB, Firewire, or Bluetooth™ connection, etc. Similarly, the device 10 may be configured to allow direct communication between similarly configured navigation devices, such that the device 10 need not necessarily utilize the communications network to share geographic location information.

In various embodiments the communications element 28 may enable the device 10 to wirelessly communicate with a communications network utilizing wireless data transfer methods such as WiFi (802.11), Wi-Max, Bluetooth™, ultra-wideband, infrared, cellular telephony, radio frequency, etc. However, the communications element 28 may couple with a communications network utilizing wired connections, such as an Ethernet cable, and is not limited to wireless methods.

The I/O ports 30 permit data and other information to be transferred to and from the processing system 16 and the location determining system 20. As illustrated in FIG. 1, the I/O ports 30 may include a TransFlash card slot 52 for receiving removable TransFlash cards and a USB port 54 for coupling with the charger 44 or another USB cable connected to another processing system such as a personal computer. Navigational software, cartographic maps and other data and information may be loaded in the device 10 via the I/O ports 30, the receiver 12, or the communications element 28.

The speaker 32 is provided for audibly reproducing audio information received by or generated by the device 10. Any number of speakers may be provided.

The housing 34 may be handheld or otherwise portable to facilitate easy transport of the device 10. In some embodiments, the housing 34 may be configured for mounting within or on an automobile or other vehicle in a generally conventional manner. The housing 34 may be constructed from a suitable lightweight and impact-resistant material such as, for example, plastic, nylon, aluminum, or any combination thereof. The housing 34 may include one or more appropriate gaskets or seals to make it substantially waterproof or resistant. The housing 34 may take any suitable shape for size, and the particular size, weight and configuration of the housing may be changed without departing from the scope of the present invention.

The components shown in FIGS. 1 and 2 and described herein need not be physically connected to one another since wireless communication among the various depicted components is permissible and intended to fall within the scope of the present invention.

Figure 4:
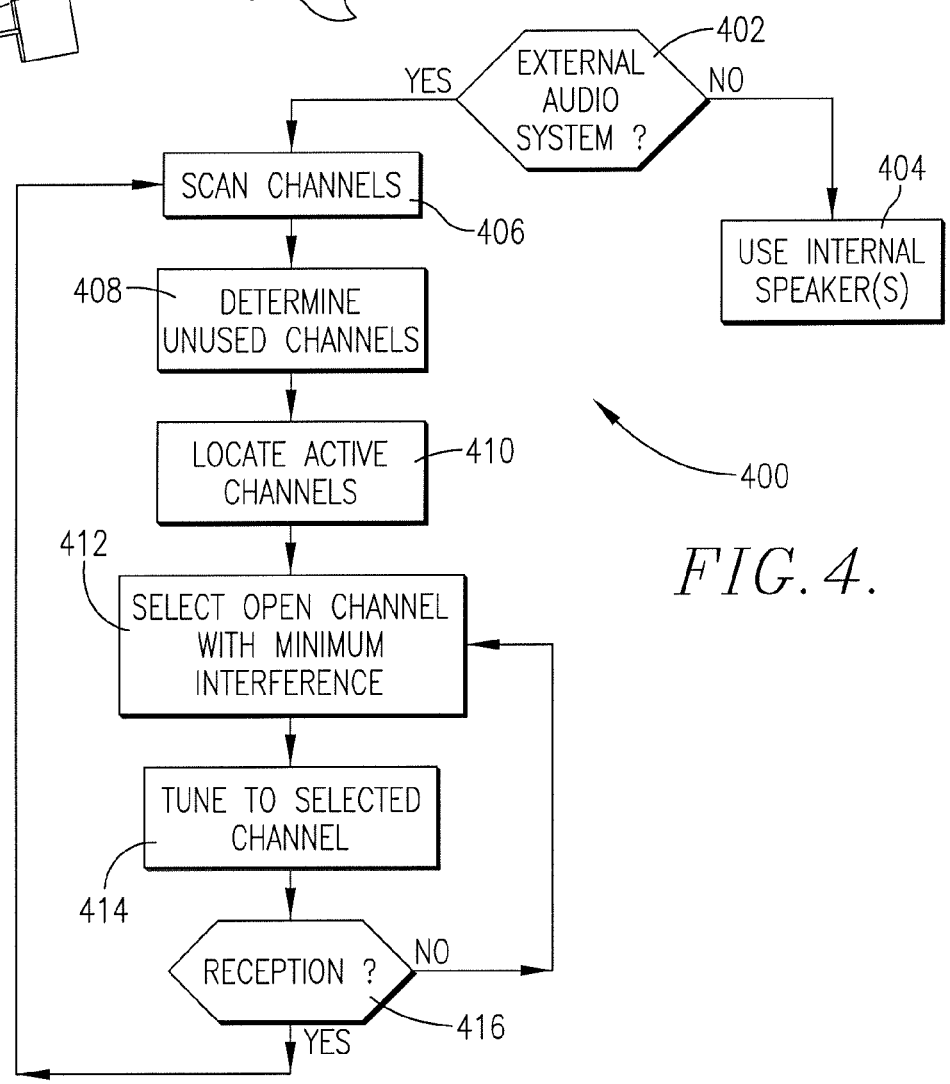
FIG. 4 is a flow diagram illustrating selected steps in a method of the present invention.

FIG. 4 illustrates certain steps in an exemplary method 400 of using an embodiment of the electronic device 10. The particular order of the steps illustrated in FIG. 4 and described herein can be altered without departing from the scope of the invention. For example, some of the illustrated steps may be reversed, combined, or even removed entirely.

The device 10 first determines whether audio information should be reproduced by the device's internal speaker 32 or transmitted for reproduction by an external audio system as set forth in step 402. In one embodiment, the processing system 16 may display a prompt such as the one shown in the screen display of FIG. 9 to ask the user which speakers should be used for reproduction of audio information.

Figure 9:
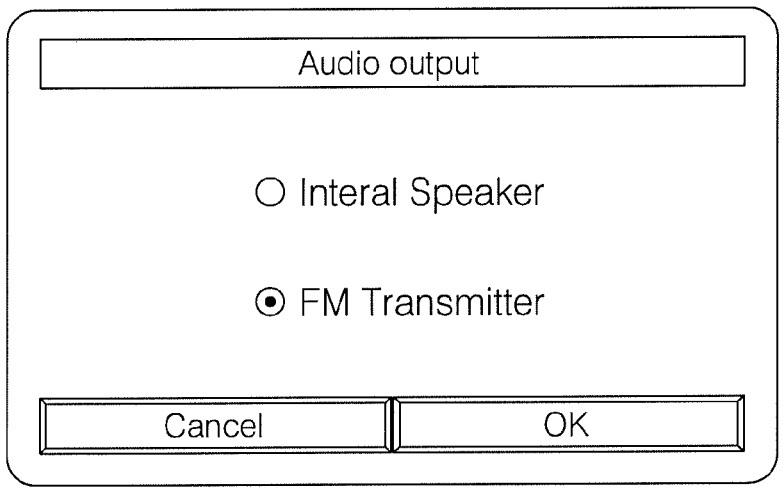
FIG. 9 is a sample screen display of the electronic device.
Figure 10:
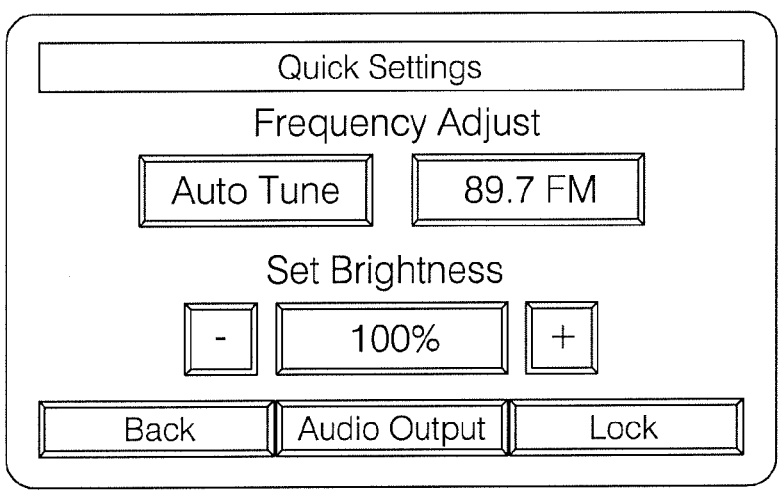
FIG. 10 is another sample screen display of the electronic device.
Figure 11:
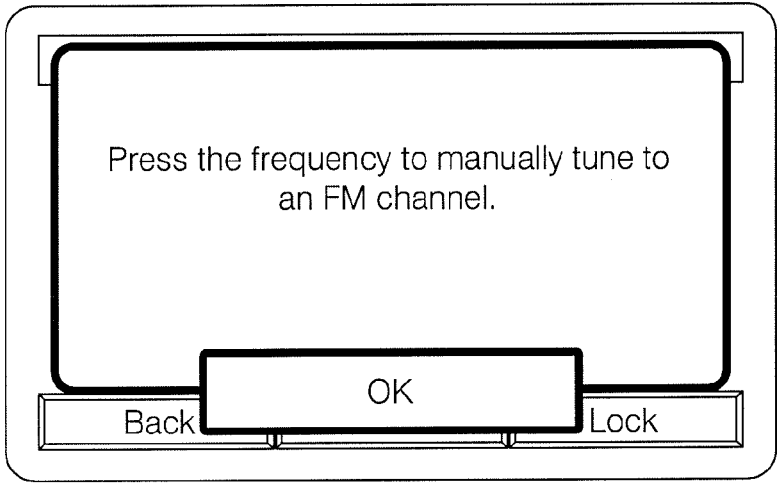
FIG. 11 is another sample screen display of the electronic device.
Figure 12:
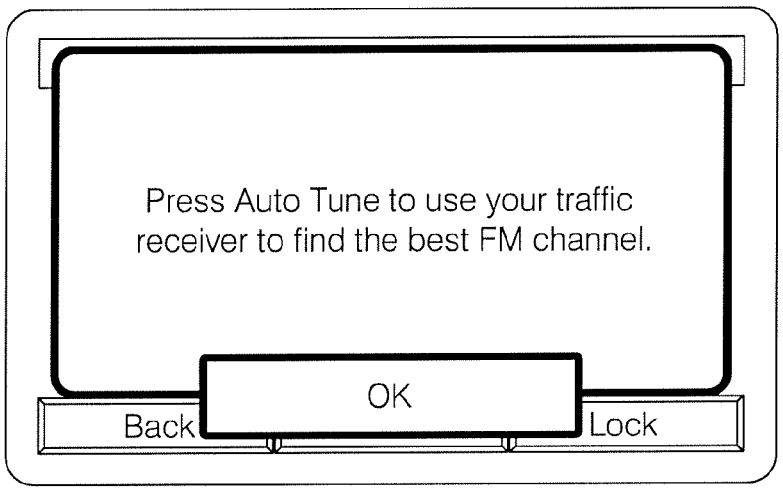
FIG. 12 is another sample screen display of the electronic device.
Figure 13:
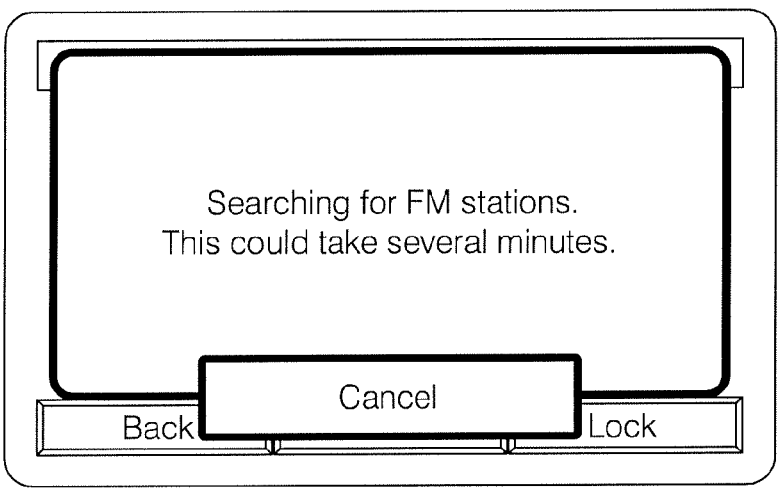
FIG. 13 is another sample screen display of the electronic device.

The user may then select whether the internal speaker 32 is to be used or whether the audio information is to be transmitted to an external audio system. For example, as shown in FIG. 9, if the user selects the "Internal Speaker" icon, the audio information is reproduced by the device's internal speaker 32 as depicted in step 404. If, on the other hand, the user selects the "FM Transmitter" icon from the prompt in FIG. 9, the device 10 initiates a procedure to select a transmission frequency for the transmitter 14. To do so, the device first determines whether it should automatically search for the best transmission frequency for the transmitter 14 or whether the user wishes to manually select the transmission frequency. For example, the device may display a prompt such as the one shown in the screen display of FIG. 10 to ask the user to select between automatic tuning and manual tuning. The device may also display instructions on how to select between automatic tuning and manual tuning such as the ones shown in the screen displays of FIGS. 11 and 12.

If the user selects manual tuning, the device 10 either tunes the frequency of the transmitter 14 to a pre-selected frequency such as 89.7 FM or allows the user to select a frequency. If the user selects the "Auto Tune" prompt from FIG. 10, the device 10 selects a frequency for the transmitter as described below and may display a message similar to the one in FIG. 13 to inform the user that a transmission frequency for the transmitter is being selected.

In the Auto Tune mode (e.g., when the "Auto Tune" prompt is selected), the processing system 16 first directs the receiver 12 to scan for unused radio channels as depicted in step 406. The receiver may scan all FM channels within the FM frequency band or may scan only a portion of the FM channels. For example, the processing system 16 may direct the receiver 12 to scan only for available channels near the lower end of the FM frequency band where fewer FM radio stations broadcast. The processing system may instruct the receiver to perform more than one scan and/or may instruct the receiver to periodically repeat the scan.

Figure 6:
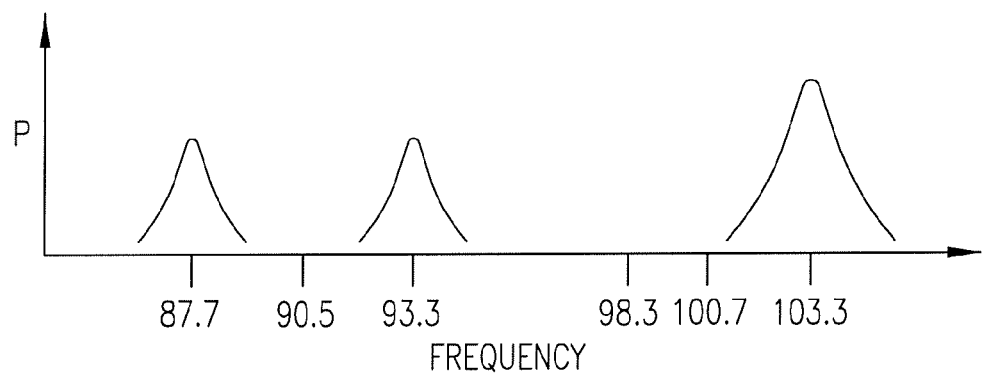
FIG. 6 is a graph illustrating certain frequency information related to the present invention.

Once the receiver 12 has scanned for available channels, the processing system 16 determines which of the radio channels are not being used by an external radio broadcaster as depicted in step 408. The processing system 16 may make this determination by selecting all channels having a received transmission strength below a threshold level. For example, in an exemplary scan of the FM frequency band, the processing system 16 may determine that channels 90.5, 98.3, and 100.7 are unused and available because the received signal strength on each of these channels is below a threshold power level. FIG. 6 graphically illustrates the results of this exemplary scan of the FM frequency band.

In embodiments of the invention, the particular threshold level used can be selected based on a number of factors including the number of potentially interfering radio channels. For example, when very few active radio channels are detected, the threshold level may be set near zero. However, when many active radio channels are detected, the threshold amount may be set higher. The sensitivity of the scan may also be adjusted based on the position of the device 10 as determined by the location determining system 20. For example, if the device 10 is in a location known to have many active radio stations, the threshold level of the scan may be increased. The device 10 can determine that it is in an area with many active radio stations by searching the database of known radio stations based on its current location.

In some embodiments, the processing system 10 may also direct the receiver 12 to perform a second scan to locate radio stations which are actively transmitting information as depicted in step 410. The receiver may scan all FM channels within the FM frequency band or may scan only a portion of the FM channels. For example, the processing system 16 may direct the receiver 14 to scan only for active channels in the same frequency range in which it scanned for unused channels in step 406. FIG. 6 illustrates an exemplary scan which shows that channels 87.7, 93.3, and 103.3 are actively transmitting information.

The scans in steps 406 and 410 may be performed separately or together. For example, the receiver 12 and processing system 16 may simultaneously search for unused radio channels and active radio channels or may perform two separate scans.

The processing system 16 next selects a channel for use by the transmitter 14 as depicted in step 412. In one embodiment, the processing system may do this by simply selecting one of the unused channels (e.g. 90.5, 98.3, 100.7) discovered during the scan of step 406. In other embodiments, the processing system 16 may also take into account the active channels (e.g. 87.7, 93.3, 103.3) detected in step 410. When both unused and active channels are considered, the processing system may select a transmission frequency for the transmitter 14 that is both unused and spectrally distant from the active channels (i.e., the difference in the selected transmission frequency for the transmitter 14 and a frequency of the closest used channel is maximized). Using the exemplary scan depicted in FIG. 6, the processing system may select channel 98.3 because it is both available and the most spectrally distant from the active channels 87.7, 93.3, and 103.3.

Figure 7:
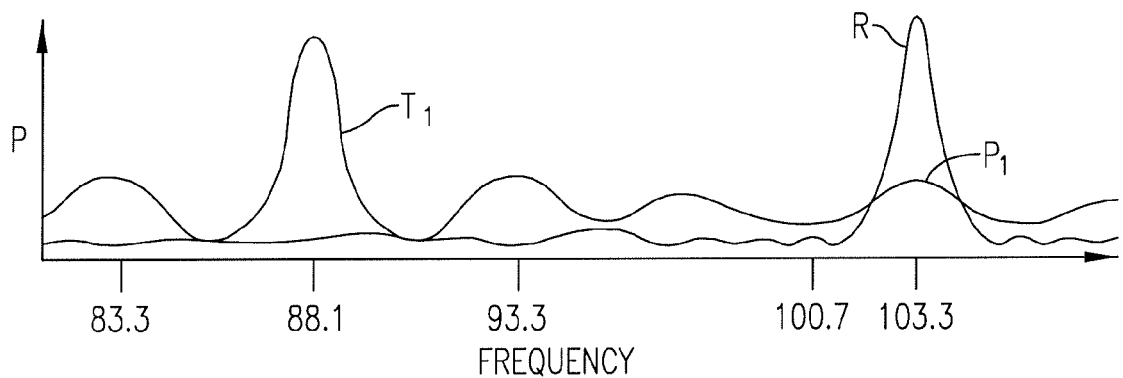
FIG. 7 is another graph illustrating certain frequency information related to the present invention.
Figure 8:
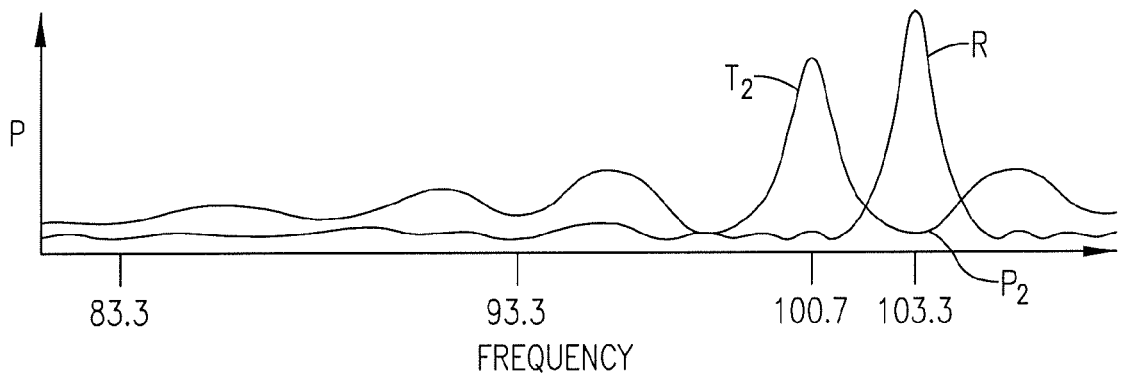
FIG. 8 is another graph illustrating certain frequency information related to the present invention.

The processing system 16 may also take into account a known transmission profile of the transmitter 14 when selecting a transmission frequency. Those skilled in the art will appreciate that transmitters can adversely affect the reception of nearby receivers even when the transmitters and receivers are not tuned to the same frequency. Transmitters have transmission profiles which vary depending on many factors. FIG. 7 illustrates an exemplary transmission profile T1 of the transmitter 14 when tuned to 88.1 FM, and FIG. 8 illustrates an exemplary transmission profile T2 for the same transmitter 14 when tuned to 100.7 FM. As can be seen from both transmission profiles, the transmitter 14 has a peak transmission power at the frequency to which it is tuned, but also radiates lesser power at other frequencies. FIGS. 7 and 8 also illustrate an exemplary receiver profile R for the receiver 12 when it is tuned to 103.3 FM and receiving transmissions from an external broadcaster on this channel.

In some cases, the transmitter 14 may actually cause less interference with the receiver 12 when it is tuned to a frequency which is closer to the reception frequency of the receiver. For example, when the receiver 12 is tuned to 103.3 as shown in FIGS. 7 and 8, the transmission profile T1 (88.1 FM) (FIG. 7) causes more interference with the receiver 12 than the transmission profile T2 (100.7 FM) even though channel 88.1 is more spectrally distant. This is because the transmission profile T1 has a secondary peak P1 which interferes with the reception frequency 103.3, whereas the transmission profile T2 has a null power level P2 at 103.3. Therefore, in this example, the processing system 16 only selects 100.7 as the transmission frequency for the transmitter 14 rather than 88.1, assuming that both channels 88.1 and 100.7 are unused by external FM transmission sources.

Once the transmission frequency for the transmitter 14 has been selected, it may be displayed on the display 22 as depicted in step 414 so that a user may tune the receiver of the external audio system to this frequency. Alternatively, the selected transmission may be communicated to the external audio system via a wired connection or a wireless connection such as WiFi, Wi-Max, Bluetooth™, ultra wide band, infrared, cellular, or radio frequency, so that the receiver of the external audio system may automatically tune itself to the selected frequency.

Figure 14:
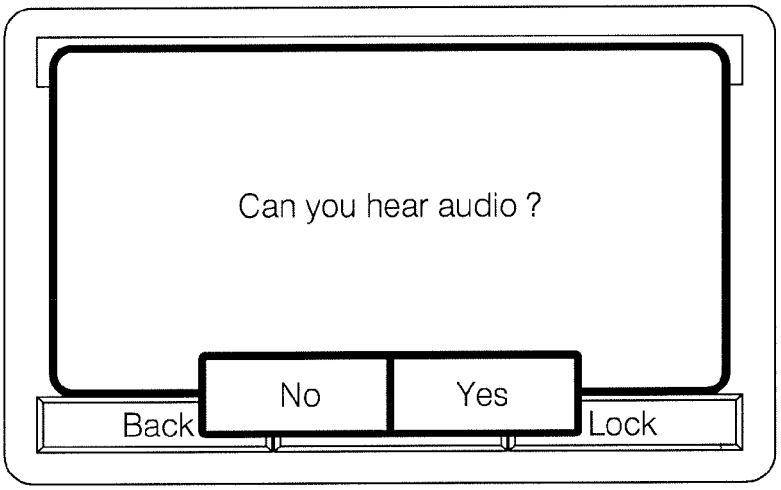
FIG. 14 is another sample screen display of the electronic device.

The processing system 16 may then display a message on the display 22 which asks the user if the audio information can be heard on the speakers of the external audio system as depicted in step 416 and as shown in the screen display of FIG. 14. If the user indicates that the audio information can be heard (e.g., by selecting the "Yes" icon), no further user action is required and the transmitter 14 continues to transmit the audio information to the external audio system over the selected channel. However, if the user indicates that he or she cannot hear the audio information over the external audio system, or if the audio information cannot be heard clearly enough because of static, interference, or the like (e.g., by selecting the "No" icon), the method reverts to step 412 to select another transmission frequency for the transmitter.

Even when the reception is clear in step 416, the method may revert back to step 406 to continue scanning for available channels and interfering channels as the device 10 moves and encounters additional external FM transmission sources. For example, the device 10 may be used in a vehicle traveling between cities. It therefore may be necessary to periodically select different transmission frequencies for the transmitter 14 to avoid conflict with active radio stations in different areas.

Figure 5:
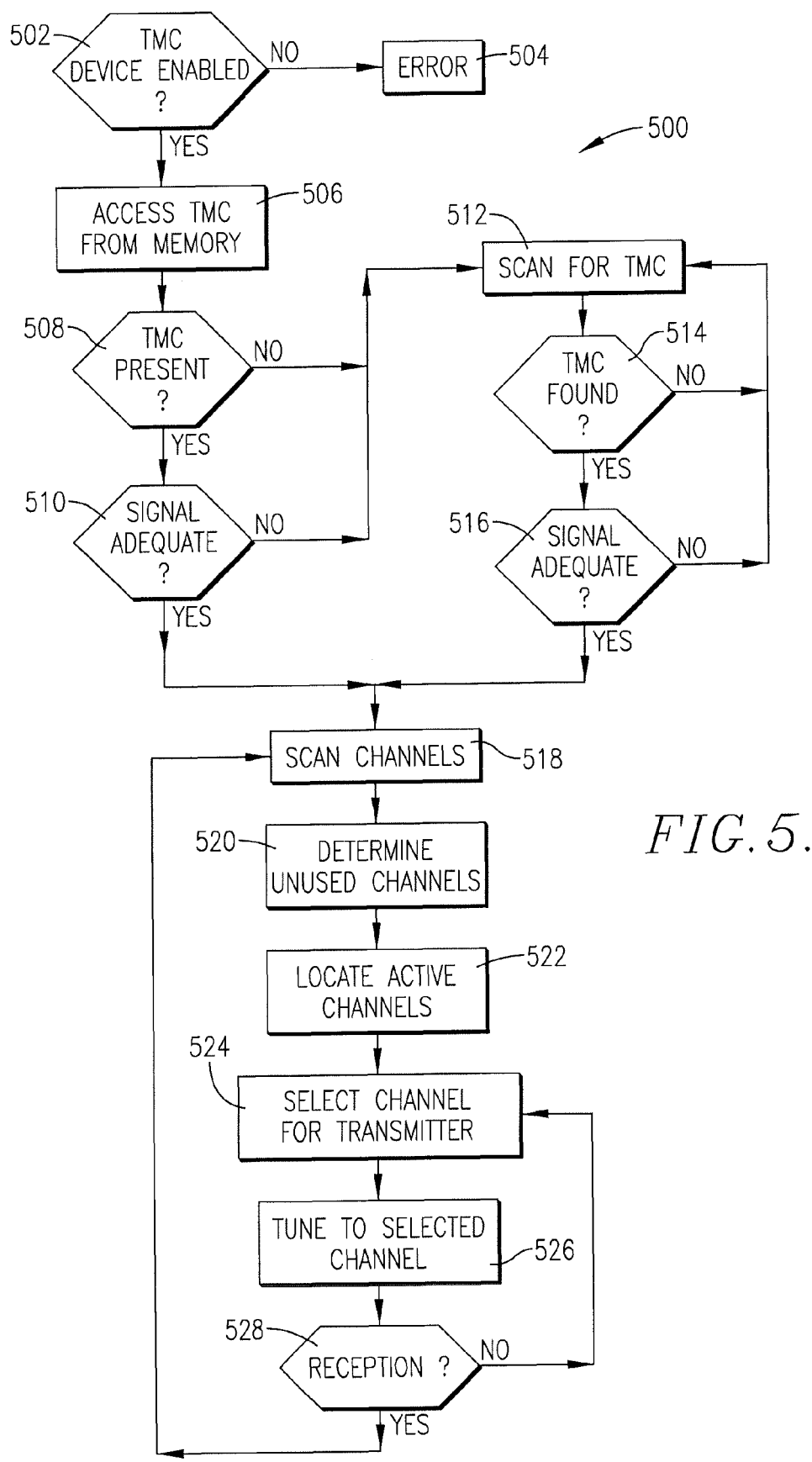
FIG. 5 is a flow diagram illustrating selected steps in a method of the present invention.

FIG. 5 illustrates certain steps in an exemplary method 500 in which the device 10 is a navigation device operable to receive traffic information from a TMC (Traffic Message Channel) traffic information broadcaster. Like the method 400 illustrated in FIG. 4, the particular order of the steps illustrated in FIG. 5 and described herein can be altered without departing from the scope of the invention.

The processing system 16 may first determine whether a TMC subscription has been purchased or whether the device is otherwise TMC enabled as depicted in step 502. If not, the processing system may display an error message and/or instructions for subscribing to a TMC service as depicted in step 504.

If the device is TMC enabled, the processing system 16 may access the memory 18 or another memory to locate a known TMC channel as depicted in step 506. The processing system may do this by simply storing the most recently used TMC channel in memory and then accessing this memory when the device is first turned on. Alternatively, the device may determine its current location with the location determining system 20 and/or the processing system 16 and then locate all active traffic information broadcasters that are in range of the current location. As described above, the device may include, or be able to access, a database or other memory which lists all known traffic information broadcasters referenced by location.

In step 508, the processing system 16 determines if traffic information is actually being broadcast over the TMC channel selected in step 506. It may do this by tuning the receiver 12 to the TMC frequency determined in step 506 and then measuring the received signal strength. If the TMC channel is active, the method proceeds to step 510 which determines if the signal strength from the selected TMC channel is adequate. If the signal strength is adequate, the method proceeds to step 518.

If traffic information is not being broadcast over the selected TMC channel as determined in step 508, or if the signal strength of the selected TMC channel is not adequate as determined in step 510, the method proceeds to step 512. In step 512, the processing system 16 directs the receiver 12 to scan the FM frequency spectrum to locate all channels where a TMC service provider is transmitting active data. Any portion of the FM frequency spectrum may be scanned and any number of scans may be performed.

In step 514, a determination is then made whether an active TMC channel was found during the scan of step 512. If an active TMC channel was found, the method proceeds to step 516 to determine if the TMC signal strength is adequate. If a determination is made that the TMC signal strength is adequate, the method proceeds to step 518.

If, however, no active TMC was found in step 514, or if the signal strength of a located TMC was inadequate in step 516, the method reverts to step 512 to perform a second scan for active TMC channels. When a second scan is made, the processing system may cause the receiver to scan all FM channels within the FM frequency band or may perform a scan of selected portions of the FM frequency band. The processing system may also disable the transmitter 14 during this second scan so that the receiver may perform a "deeper" scan without any interference from the transmitter.

Once an acceptable TMC signal is found, the method starts a procedure to select a transmission frequency for the transmitter 14. The processing system 16 first directs the receiver 12 to scan for available radio channels as depicted in step 518. The receiver may scan all FM channels within the FM frequency band or may scan only a portion of the FM channels. For example, the processing system may direct the receiver to scan only for available channels near the lower end of the FM frequency band where fewer FM radio stations transmit.

The processing system 16 then determines which of the radio channels are not being used by an external radio broadcaster as depicted in step 520. The processing system may do this by selecting all channels having a received transmission strength below a threshold level as explained above with method 400.

The processing system 16 may then direct the receiver 12 to perform a second scan to locate radio stations which are actively transmitting information as depicted in step 522. The receiver may scan all FM channels within the FM frequency band or may scan only a portion of the FM channels as described above in the discussion of method 400. The scans in steps 518 and 522 may be performed separately or together.

The processing system then selects a channel for use by the transmitter as depicted in step 524. In one embodiment, the processing system may do this by selecting one of the unused channels (e.g. 90.5, 98.3, and 100.7) discovered during the scan of step 518. In other embodiments, the processing system may also take into account the active channels detected in step 522. When both the unused and active channels are considered, the processing system may select a transmission frequency that is both unused and spectrally distant from the active channels. Further, in this embodiment, the processing system selects a radio channel for use by the transmitter which does not interfere with the receipt of the traffic information. Thus, the processing system may select a transmission frequency which is also spectrally distant from the frequency of the TMC channel broadcast by the external traffic information broadcaster. For example, using the information from scan depicted in FIG. 6, the processing system may select channel 90.5 as the transmission channel because this channel is both available and the most spectrally distant from an active TMC (e.g., channel 103.3). Additionally or alternatively, the processing system may take into account a transmission profile of the traffic information broadcaster's transmitter when selecting the transmission frequency.

Once the transmission frequency for the transmitter 14 has been selected, it may be displayed on the display as depicted in step 526 so that a user may tune the receiver of the external audio system to this frequency. Alternatively, the selected transmission may be communicated to the external audio system via a wired connection or a wireless connection such as WiFi, Wi-Max, Bluetooth™, ultra wide band, infrared, cellular, or radio frequency, so that the receiver of the external audio system may automatically tune itself to the selected frequency.

The processing system 16 may then display a message on the display which asks the user if the audio information can be heard on the speakers of the external audio system as depicted in step 528. If the user indicates that the audio information can be heard (e.g., by selecting the "Yes" icon), no further action is required and the transmitter 14 continues to transmit the audio information to the external audio system over the selected channel. However, if the user indicates that he or she cannot hear the audio information over the external audio system, or if the audio information cannot be heard clearly enough because of static, interference, or the like (e.g., by selecting the "No" icon), the method reverts to step 524 to select another transmission frequency for the transmitter.

As with the method 400, the method 500 may revert back to step 518 to continue scanning for available channels and interfering channels as the device 10 moves and encounters additional external FM transmission sources. For example, the device 10 may be used in a vehicle traveling between cities. It therefore may be necessary to periodically select different transmission frequencies for the transmitter 14 to avoid conflict with active radio stations in different areas.

In another embodiment of the invention, the device 10 may select a transmission frequency for the transmitter 14 based only on the current location of the device. To do so, the processing system determines its current location and then accesses the database of transmission frequencies cross-referenced to locations. For example, the processing system may select a transmission frequency from a database of previously used frequencies, a database of optimal frequencies, or the like. The transmission frequency for each location may be selected to avoid interference with all known active radio channels (e.g., FM audio and TMC stations) in the location. The optimal transmission frequencies may also be selected to take into account the transmission profile of the transmitter. The processing system determines or accesses its current location and then searches the database for the optimal transmission frequency based on the location.

Although the invention has been described with reference to the exemplary embodiments illustrated in the attached drawing figures, it is noted that equivalents may be employed and substitutions made herein without departing from the scope of the invention as recited in the claims. For example, the electronic device 10 and its components illustrated and described herein are merely examples of a device and components that may be used to implement the present invention and may be replaced with other devices and components without departing from the scope of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A portable electronic device, comprising:
    a speaker;
    a user interface operable to be employed by a user to select internal audio playback or external audio playback;
    a radio frequency receiver operable to wirelessly receive traffic information from one or more traffic information broadcasters;
    a radio frequency transmitter for transmitting audio information to an external audio system;
    a processing system coupled with the speaker, the user interface, the radio frequency receiver, and the radio frequency transmitter, the processing system operable to identify one or more traffic information frequencies used by the one or more traffic information broadcasters; and
    a portable handheld housing for housing the speaker, the user interface, the receiver, the transmitter, and the processing system,
    wherein, if internal audio playback is selected through the user interface, the processing system is operable for providing the audio information to the speaker for playback,
    wherein, if external audio playback is selected through the user interface, the processing system is operable for:
        directing the receiver to scan for available radio channels over which the transmitter can transmit the audio information, and
        using the one or more identified traffic information frequencies and the scan for available radio channels to select an available radio channel as the radio channel best suited for use by the radio frequency transmitter to transmit information to the external audio system.

2. The portable electronic device as claimed in claim 1, further including a display for displaying the selected radio channel.

3. The portable electronic device as claimed in claim 2, wherein the display includes a touch-screen display that comprises a portion of the user interface.

4. The portable electronic device as claimed in claim 1, wherein the processing system is further operable to automatically tune the radio frequency transmitter to the selected radio channel.

5. The portable electronic device as claimed in claim 1, wherein the processing system is operable to direct the external audio system to tune to the selected channel.

6. The portable electronic device as claimed in claim 1, wherein the processing system directs the radio frequency receiver to scan for radio channels which are not being actively used for transmission of information.

7. The portable electronic device as claimed in claim 6, wherein the processing system further directs the radio frequency receiver to scan for radio channels which are being used for transmission of information.

8. The portable electronic device as claimed in claim 7, wherein the processing system selects the available channel best suited for use by the radio frequency transmitter by picking an available radio channel which is spectrally distant from the radio channels which are being used for transmission of information.

9. The portable electronic device as claimed in claim 1, wherein the processing system considers a transmission profile of the radio frequency transmitter when selecting the selected radio channel.

10. The portable electronic device as claimed in claim 1, wherein the radio frequency transmitter is capable of transmitting audio and data to the external audio system.

11. The portable electronic device as claimed in claim 1, further including:
    a memory comprising a database of traffic information broadcasters indicating the locations of a plurality of traffic information broadcasters; and
    a location determining system operable to determine the current geographic location of the device,
    wherein the processing system is operable to identify the one or more traffic information frequencies used by the one or more traffic information broadcasters by accessing the database and comparing the current geographic location of the device with the locations of the traffic information broadcasters.

12. A method of transmitting information between a portable electronic device and an external audio system, the portable electronic device including an internal speaker, a receiver, and a transmitter, the method comprising:
    wirelessly receiving traffic information from one or more traffic information broadcasters;
    identifying one or more traffic information frequencies used by the one or more traffic information broadcasters;
    receiving on the portable electronic device a user selection of internal audio playback or external audio playback;
    if internal playback is selected, playing the information through the internal speaker; and
    if external playback is selected—
        causing the receiver to scan for currently unused radio channels;
        using the one or more identified traffic information frequencies and the scan for unused radio channels to select a transmission channel ; and
        causing the transmitter to transmit the information from the portable electronic device to the external audio system using the selected transmission channel.

13. The method as claimed in claim 12, further comprising causing the receiver to scan for currently active radio channels, wherein selecting one of the currently unused radio channels comprises selecting a currently active radio channel that is spectrally distant from the currently active radio channels.

14. The method as claimed in claim 13, wherein selecting one of the currently unused radio channels further comprises considering a transmission profile of the transmitter when selecting one of the currently unused radio channels which does not interfere with the currently active radio channels.

15. The method as claim in claim 12, wherein the identified traffic information frequencies are identified by:
- accessing a database of traffic information broadcasters indicating the locations of a plurality of traffic information broadcasters; and
- comparing a current geographic location with the locations of the traffic information broadcasters.

* * * * *